United States Patent Office 3,052,662
Patented Sept. 4, 1962

3,052,662
POLYVINYL ALCOHOL PRODUCT AND PROCESS
FOR MAKING THE SAME
Makoto Shiraishi and Maskazu Matsumoto, Kurashiki City, Japan, assignors to Kurashiki Rayon Co., Ltd., Okayama Prefecture, Japan, a corporation of Japan
No Drawing. Filed June 30, 1959, Ser. No. 823,803
7 Claims. (Cl. 260—91.3)

This invention relates to a novel product of polyvinyl alcohol. More specifically, the invention relates to polyvinyl alocohol products having terminal carbonyl groups and to the preparation of such products.

This application is a continuation-in-part of our application Serial Number 787,381, filed January 19, 1959, now U.S. Patent Number 2,983,759, for "Polyvinyl Alcohol Product and Process".

In our parent application a method was described for cleaving polyvinyl alcohol polymers into smaller units having terminal carbonyl groups. In this process the polyvinyl alcohol is partially oxidized until an amount up to 20% of the polyvinyl alcohol hydroxyl groups is converted to carbonyl groups. Then the partially oxidized polyvinyl alcohol is treated with alkali, whereby cleavage takes place at the carbonyl group in a reverse aldol reaction with the production of lower molecular weight polyvinyl alcohol having terminal carbonyl groups. The reverse aldol cleavage is believed to proceed as follows:

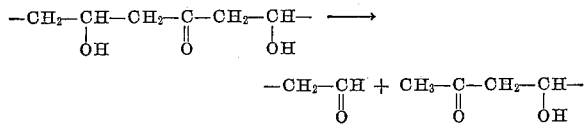

The aldol structure undergoes keto-enol isomerism in aqueous solution so that a part of the ketone groups may exist in the enol form. Since some of the keto groups in the molecule may be present in the enol form all of the keto groups present will not necessarily undergo the reverse aldol cleavage. Therefore, complete cleavage may not occur.

We have discovered that, if the hydrogen ion concentration of the partially oxidized polyvinyl alcohol solution is adjusted to pH values of less than 3, the equilibrium will be shifted in the direction of the keto form so that on the subsequent cleavage by the reverse aldol reaction substantially complete cleavage will occur. Moreover, the degree of cleavage can be controlled from about 0% to 100% by adjusting the pH of the partially oxidized polyvinyl alcohol solution to a predetermined value.

Low molecular weight polyvinyl alcohol having terminal carbonyl groups is useful. An important use for such material is as a cross-linking agent for polyvinyl alcohol through acetal formation. In may be mixed with ordinary polyvinyl alcohol, or with copolymerized polyvinyl alcohol for cross-linking purposes. Other uses will be apparent to those skilled in the art.

It is an object of the present invention to provide a process for the production of polyvinyl alcohol having terminal carbonyl groups.

Another object of the invention is to provide a process for controlling the molecular size of the low molecular weight polyvinyl alcohol containing the terminal carbonyl groups.

Still another object of the invention is to provide for the production of low molecular weight terminal-carbonyl containing polyvinyl alcohol.

Other objects will be apparent from the specification and claims.

In carrying out the present invention polyvinyl alcohol is partially oxidized whereby a percentage of the hydroxyl groups thereof are converted to the carbonyl groups, that is, the

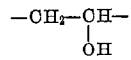

groups present in the molecule are oxidized to

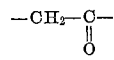

groups. Subsequently the pH of the solution of the partially oxidized polyvinyl alcohol is adjusted to a predetermined value. Finally the polyvinyl alcohol product is treated with alkali, whereby cleavage of the partially oxidized polyvinyl alcohol takes place at the carbonyl groups in a reverse aldol reaction, with the production of lower molecular weight polyvinyl alcohol having terminal carbonyl groups.

The polyvinyl alcohol is oxidized in accordance with known procedures. Suitable oxidizing agents are those which will oxidize the 1,3-glycol structure. Alkaline oxidizing agents, for example, alkali metal chlorites and hypochlorites, calcium chlorites and hypochlorites (including bleaching powders), ammonium persulfate, N-bromosuccinimide, N-chlorosuccinimide and the like, are usually preferred. Acidic oxidizing agents may also be used. Oxidation of the polyvinyl alcohol solution may also take place in the light with the aid of an added sensitizer. The exact oxidizing conditions are readily determined by routine procedure.

To adjust the pH of the aqueous solution of the partially oxidized polyvinyl alcohol, acid or alkali is added to the solution in an amount sufficient to produce the pH necessary to give the desired amount of cleavage. The lower the pH, the greater the degree of cleavage. Substantially complete cleavage of the partially oxidized polyvinyl alcohol by this process requires adjustment of the pH to less than 3, and preferably at about 1.2 to 1.5. Less complete cleavage occurs when the acidity is from pH 3 to pH 6.

For adjustment of the pH of alkaline polyvinyl alcohol solutions, suitable acids are added, for example, mineral acids such as hydrochloric and sulfuric acids, or organic acids such as chloroacetic, formic or benzene sulfonic acid. If adjustment of the pH with alkali is desired, the same alkali that is used in the subsequent alkali cleavage treatment is usually preferred.

Acid treatment may take place with the polyvinyl alcohol in solution, or in an aqueous medium insufficient for the polyvinyl alcohol to go into solution. A greater degree of cleavage results when the polyvinyl alcohol is in solution. The temperature of the acid treatment may vary within wide limits. Usually room temperature is satisfactory, although temperatures up to 100° C. are also used. The time required for the acid treatment varies from about 30 minutes to one hour. The acid solution of the oxidized polyvinyl alcohol may then be neutralized with alkali just prior to the cleavage step in the procedure.

Strong bases are used to cleave the partially oxidized polyvinyl alcohol. Sodium hydroxide is especially preferred. Other bases which can be used include potassium hydroxide, lithium hydroxide and the like. The cleavage is preferably carried out in aqueous solution at temperatures up to 100° C. for a few minutes up to an hour or more. For complete cleavage of the acid treated product temperatures of about 100° C. are usually necessary. Substantially 100% cleavage results when the aqueous solution of the partially oxidized polyvinyl alcohol is adjusted to a pH of less than 3 and subsequently treated with alkali at 100° C.

The term "polyvinyl alcohol" as used in the specification and claims is to be understood to refer not only to polyvinyl alcohol proper but also to its copolymers with other polymerizable compounds such as ethylene, maleic anhydride, acrylonitrile and the like, provided such copolymers contain at least 80% by weight of the polyvinyl alcohol. Such copolymers are known in the art.

The following examples illustrate the invention.

*Example 1*

An aqueous solution containing 10% by weight of a partially oxidized polyvinyl alcohol having an average degree of polymerization of about 1590 and 0.112 mol percent of carbonyl groups was divided into five portions. Sufficient hydrochloric acid was added to each portion to adjust the pH to 6.0, 4.4, 3.2, 1.8 and 1.5 respectively. Each solution was left standing for one hour at 30° C. and then neutralized with alkali. Then 10 cc. of 5 N caustic soda solution was added to 350 cc. of each solution. The resulting solutions were then heated for 15 hours at 100° C. under a nitrogen atmosphere to effect the reverse aldol reaction. The resulting polyvinyl alcohol was precipitated with acetone. The product was washed until neutral with methyl alcohol and dried under reduced pressure.

The following table shows the results obtained:

| | | | | | |
|---|---|---|---|---|---|
| pH before cleavage | 6.0 | 4.4 | 3.2 | 1.8 | 1.5 |
| Degree of polymerization after cleavage | 990 | 885 | 786 | 645 | 605 |

The solution which had been acidified to pH 1.5 had the value of 605 for the average degree of polymerization which agreed, within the limits of experimental error, with the calculated value of 617 for complete cleavage of the carbonyl group, using the percentage of carbonyl groups in the molecule prior to cleavage as the basis for the calculation.

*Example 2*

An aqueous solution containing a partially oxidized polyvinyl alcohol having an average degree of polymerization of about 1545 and 0.109 mol percent of carbonyl groups was acidified with hydrochloric acid to give a pH of 1.2. The resulting solution was heated to 100° C. for 30 minutes until it was well dissolved. It was then neutralized with caustic soda. Then 10 cc. of 5 N caustic soda solution was added to 350 cc. of the solution as in Example 1. The resulting solution was then heated for 2 hours under a nitrogen atmosphere to effect the reverse aldol reaction.

The polyvinyl alcohol thus produced was precipitated with methyl alcohol, washed until neutral with methyl alcohol, and dried. The resulting polyvinyl alcohol product had an average degree of polymerization of 618. The number of carbonyl groups per polymer molecule averaged 2.0.

We claim:

1. The process for producing vinyl alcohol polymers having terminal carbonyl groups from a first vinyl alcohol polymer, said first vinyl alcohol polymer containing at least 80% polyvinyl alcohol, which comprises the steps of reacting said first vinyl alcohol polymer with an oxidizing agent effective to oxidize the 1,3-glycol structure of said first polymer to effect oxidation of at least some and up to 20 mol percent of the vinyl alcohol units of said first polymer to carbonyl group containing units having the formula

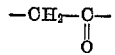

adjusting the pH of an aqueous solution of the resulting partially-oxidized polymer to a predetermined pH of from 1.2–6, allowing any of said polymer separated from the solution as a result of said adjustment of the pH to go back into solution, and subsequently neutralizing said solution and reacting the partially oxidized vinyl alcohol polymer in said solution with alkali to cleave the partially-oxidized polymer to form said polymer having terminal carbonyl groups.

2. The method of claim 1 wherein the predetermined pH is less than 3.

3. The method of claim 1 wherein the predetermined pH is 1.5 and the cleavage treatment with alkali takes place at 100° C.

4. A polyvinyl alcohol product prepared by the method of claim 1.

5. The process for producing vinyl alcohol polymers having terminal carbonyl groups from a first vinyl alcohol polymer containing at least 80% polyvinyl alcohol, which comprises the steps of reacting said first vinyl alcohol polymer with an oxidizing agent effective to oxidize the 1,3-glycol structure of said first polymer to effect oxidation of at least some and up to 20 mol percent of the vinyl alcohol units of said first polymer to carbonyl group containing units having the formula

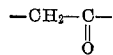

adjusting the pH of an aqueous solution of the resulting partially oxidized polymer to a predetermined pH of from 1.2–6, allowing any of said polymer separated from the solution as a result of said adjustment of the pH to go back into solution, and subsequently neutralizing said solution and reacting the partially oxidized polymer in said solution with alkali to cleave the partially oxidized polymer to form said polymer having terminal carbonyl groups, the extent of cleavage increasing in proportion to the decrease in the pH and reaching substantially complete cleavage at a pH of 1.2.

6. The process for producing vinyl alcohol polymers having terminal carbonyl groups from a first vinyl alcohol polymer, said first vinyl alcohol polymer containing at least 80% polyvinyl alcohol, which comprises the steps of reacting said first vinyl alcohol polymer in aqueous solution with an oxidizing agent effective to oxidize the 1,3-glycol structure of said first polymer to effect oxidation of at least some and up to 20 mol percent of the vinyl alcohol units of said first polymer to carbonyl group containing units having the formula

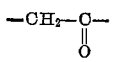

adjusting the pH of the aqueous solution of the resulting partially-oxidized polymer to a predetermined pH of from 1.2–6, allowing any of said polymer separated from the solution as a result of said adjustment of the pH to go back into solution, and subsequently neutralizing said solution and reacting the partially oxidized polymer in said solution with alkali to cleave the partially oxidized polymer to form said polymer having terminal carbonyl groups.

7. The process for producing vinyl alcohol polymers having terminal carbonyl groups from a first vinyl alcohol polymer, said first vinyl alcohol polymer containing at least 80% polyvinyl alcohol, which comprises the steps of reacting said first vinyl alcohol polymer in aqueous solution with an oxidizing agent effective to oxidize the 1,3-glycol structure of said polymer to effect oxidation of at least some and up to 20 mol percent of the vinyl alcohol units of said first polymer to carbonyl group containing units having the formula

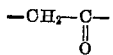

adjusting the pH of the aqueous solution of the resulting partially oxidize polymer to a predetermined pH of from 1.2–6, allowing any of said polymer separated from the solution as a result of said adjustment of the pH to go back into solution, and subsequently neutralizing said solution and reacting the partially oxidized polymer by heating said solution with alkali to cleave the partially oxidized polymer to form said polymer having terminal carbonyl groups.

References Cited in the file of this patent

UNITED STATES PATENTS 2,536,980  Jones ------------------ Jan. 2, 1951